United States Patent [19]

Tajime

[11] 3,762,722

[45] Oct. 2, 1973

[54] AUTOMATIC RECORD CHANGER DEVICE

[75] Inventor: Koichi Tajime, Yokohama, Japan

[73] Assignee: Victor Company of Japan, Yokohama City, Japan

[22] Filed: Aug. 28, 1970

[21] Appl. No.: 67,762

[30] Foreign Application Priority Data

Sept. 1, 1969 Japan .............................. 44/68637

[52] U.S. Cl. .............................................. 274/10 S

[51] Int. Cl. .......................................... G11b 17/04

[58] Field of Search ......................... 274/10 S, 10 R

[56] References Cited

UNITED STATES PATENTS

| | | | |
|---|---|---|---|
| 3,257,114 | 6/1966 | Hansen | 274/10 S |
| 3,201,131 | 8/1965 | Ansar et al. | 274/10 S |
| 3,214,176 | 10/1965 | Morrison | 274/10 S |
| 3,336,032 | 8/1967 | Hammond | 274/10 S |
| 3,201,130 | 8/1965 | Morrison et al. | 274/10 S |

*Primary Examiner*—Leonard Forman
*Assistant Examiner*—Steven L. Stephan
*Attorney*—Stevens, Davis, Miller and Mosher

[57] ABSTRACT

An automatic record changer device of the type in which records yet to be played are supported by a plurality of record supporting members pivotally mounted at the upper portion of a spindle adapted to move up and down within a main spindle body and adapted to be withdrawn into the main spindle body as the spindle moves downwardly so that only the lowermost record may be dropped onto a turntable. The device is capable of detecting the absence of records on the spindle and rendering all the elements of the device inoperative after completion of the playing of the last record.

5 Claims, 10 Drawing Figures

K. TAJIME
INVENTOR.

BY Stevens, Davis,
Miller & Mosher
ATTORNEYS

PATENTED OCT 2 1973 3,762,722

SHEET 2 OF 5

AUTOMATIC RECORD CHANGER DEVICE

This invention relates to record changer devices, and more particularly it refers to an automatic record changer device of the type having no special record support which is adapted to detect the presence or absence of records on a spindle and control the operation of a pickup arm and the like based on the results of detection.

A main object of this invention is to provide a record changer device of the type having no special record support which is novel in construction.

Another object of the invention is to provide a record changer device which is stable and reliable in performance and very simple in construction.

A further object of the invention is to provide a record changer device which permits detection of, by a simple construction, the presence or absence of records on a spindle.

Still another object of the invention is to provide a record changer device which detects the presence or absence of records on a spindle and accurately controls the operation of a pickup arm and power source switch by simple means operatively associated with a detection means.

Additional objects as well as features and advantages of the invention will become evident from the description set forth hereinafter when considered in conjunction with the accompanying drawings, in which.

The present invention will be explained with reference to the accompanying drawings wherein like reference characters designate similar parts in all the drawings.

Figure 2:
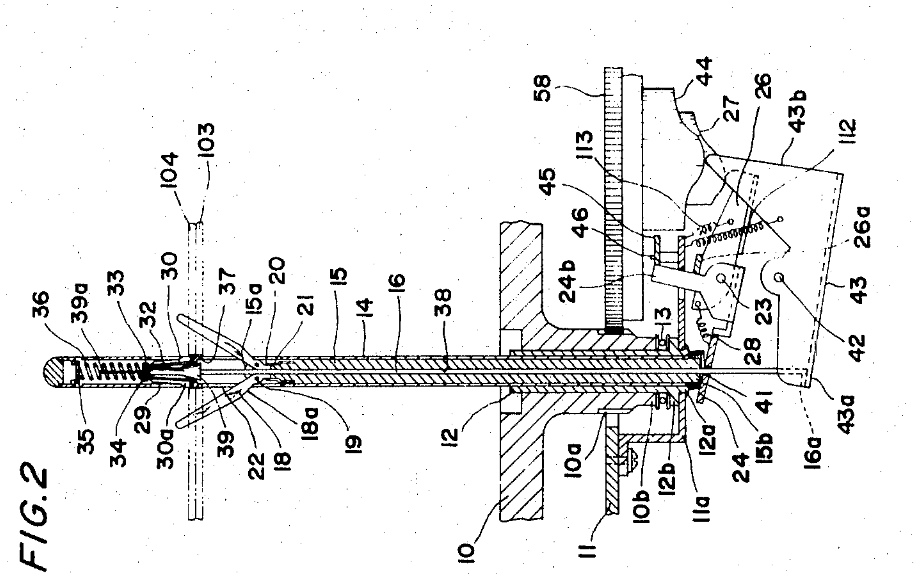
FIGS. 1 and 2 are longitudinal sectional side views of a spindle mechanism and drive means therefor used in an embodiment of the device according to this invention.
Figure 1:
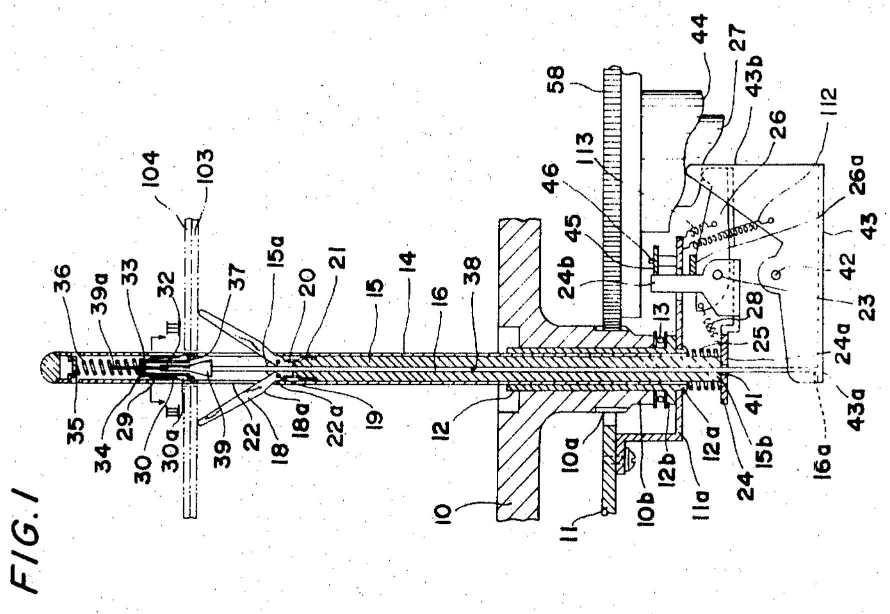

In FIG. 1 and FIG. 2, a turntable 10 including a turntable gear 10*a* attached to its base is rotatably supported by a cylindrical shaft 12 secured at its lower end portion 12*a* to a subsidiary base plate 11*a* attached to a base plate 11. A bearing 13 is interposed between a ledge 12*b* formed at the lower end of the cylindrical shaft 12 and a lower end portion 10*b* of a base portion of the turntable 10. A tube 14 serving as a sleeve for a spindle 15 has a base portion which is inserted in the cylindrical shaft 12. The tube 14 is secured to the cylindrical shaft 12 by some suitable securing means.

Figure 4:
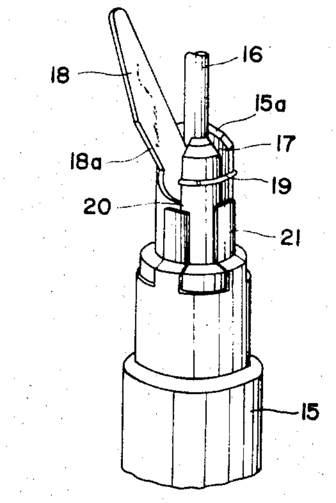
FIG. 4 is a perspective view of one of the support arms of the embodiment of FIG. 1 showing the manner in which the arm is mounted.

The spindle 15 which is hollow is mounted within the tube 14 for vertical sliding motion therein. A spindle 16 is mounted within the hollow spindle 15 for vertical sliding motion therein. As shown in FIG. 4, three vertically arranged cutouts 17 are formed at an upper end 15*a* of the hollow spindle 15 with the cutouts 17 being disposed radially and spaced apart from one another by 120°. Three support arms 18 having lower ends inserted in the cutouts 17 are pivotally supported by a ring 19 fitted over the outer peripheral surface of the hollow spindle 15. The ring 19 is resiliently fitted in a groove formed on the outer peripheral surface so that its movements axially of the spindle 15 is prevented. Each support arm 18 includes a base 20 extending downwardly from the point at which the arm 18 is pivotally supported by the ring 19. Plate springs 21 resiliently holding down the bases 20 of the arms 18 from outside are secured about the upper end of the outer peripheral surface of the hollow spindle 15. The support arms 18 are urged by the biasing force of the plate springs 21 to project outwardly through slots 22 formed in the tube 14 to be converted into a state in which the arms 18 are spread apart and diverging upwardly. On the other hand, the hollow spindle 15 has a lower end 15*b* which extends downwardly of the cylindrical shaft 12 and is received by a horizontal arm 24*a* of an L-shaped lever 24 pivotally supported by a shaft 23. The L-shaped lever 24 is operated by a cam 27 through a drive lever 26 pivotally supported by the shaft 23. A spring 28 is mounted between the L-shaped lever 24 and drive lever 26. Thus, when the drive lever 26 is moved pivotally in the clockwise direction in FIG. 1, the L-shaped lever 24 is moved in the same direction by the biasing force of the spring 28, but when the drive lever 26 is moved pivotally in the anticlockwise direction, its abutting portion 26*a* moves a vertical arm 24*b* of the L-shaped lever 24 so as to thereby operated the L-shaped lever 24 directly.

Figures 5, 8:
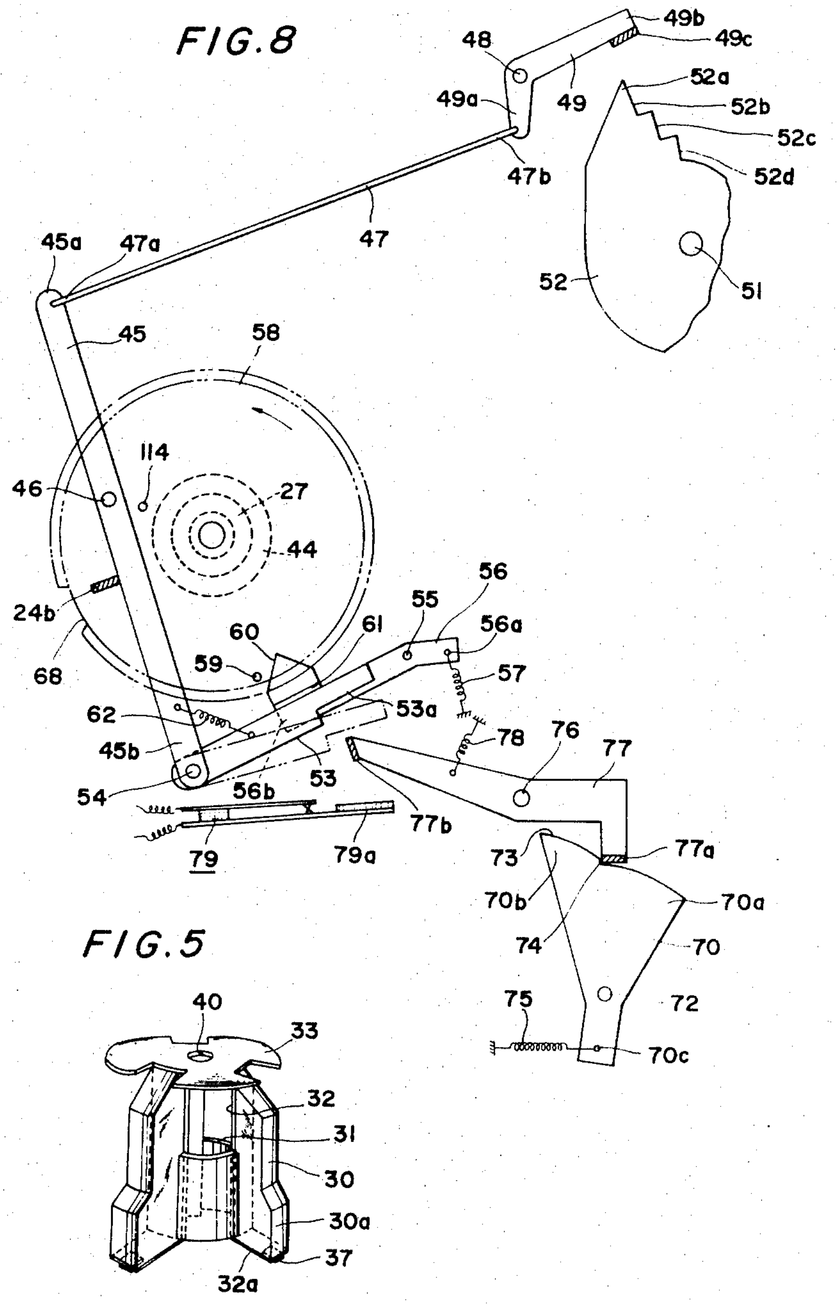
FIG. 5 is a perspective view of a record spreading member of the embodiment of FIG. 1 showing the manner in which the member is supported.

As shown in FIG. 1 and FIG. 2, three windows 29 are provided in the sleeve or tube 14 in positions slightly above the slots 22 and displaced peripherally by 60° from the positions in which the support arms 18 project outwardly. Disposed in each window 29 is a lower protrusion 30*a* of a spreading member 30 made of rubber or other resilient material. As shown in FIG. 5, the three spreading members 30 are formed integrally with connecting members 31 each disposed between the spreading members 30, and secured to the outer surfaces of an L-shaped plate spring 32 which is formed in three pieces. The plate spring 32 is formed as a depending leg of a discal head 33 and normally urges the lower protrusions 30*a* of the spreading members 30 to be withdrawn into the windows 29. A washer 34 rests on the discal head 33, and the discal head 33 is held in place as it is pressed downwardly at all times by a compression spring 36 interposed between the washer 34 and an upper end portion 35 of the tube 14, and at the same time as bent lower end portions 32*a* of the plate spring 32 abut against inwardly bent portions 37 formed at the lower ends of the windows 29.

The hollow spindle 15 has a central axial bore 38 through which the spindle 16 extends for vertical sliding motion therein. Mounted at an upper end of the spindle 16 is a conical piece 39 formed with an upwardly directed extension 39*a* of reduced diameter which extends through an opening 40 formed in the discal head 33 and an opening formed in the washer 34. The spindle 16 has a lower end portion which extends through the lower end 15*b* of the hollow spindle 15 and an opening 41 formed in the horizontal arm 24*a* of the L-shaped lever 24. A lower end 16*a* of the spindle 16 is received by a horizontal arm 43*a* of a lever 43 pivotally supported by a shaft 42 and adapted to be operated by a cam 44 through a vertical arm 43*b* of the lever 43.

Pivotally supported by a shaft 46 secured to the upper surface of the subsidiary base plate 11*a* is a detection lever 45 (See FIGS. 1, 2, 6, 8 and 9) adapted to be moved by a side surface of the vertical arm 24*b* of the L-shaped lever 24.

Figure 7:
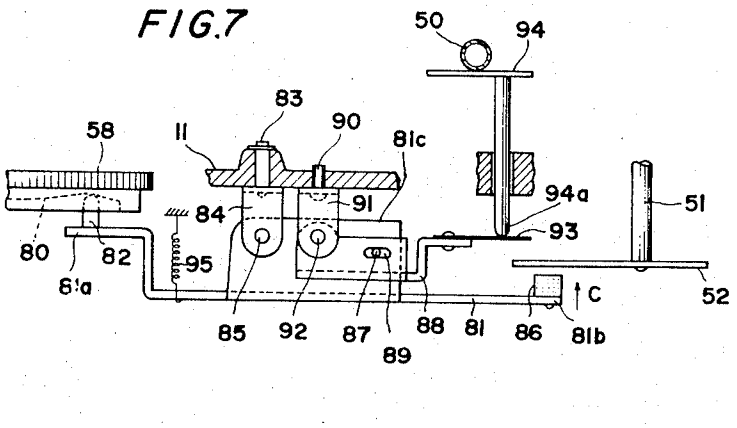
FIG. 7 is a front view of a drive means for a pickup arm of the embodiment shown in FIG. 6.

In FIG. 8, the detection bar 45 has one end 45*a* which is pivotally connected to one end 47*a* of a rod 47 which is connected at the other end 47*b* thereof to one end 49*a* of a clamp lever 49 pivotally supported by a shaft 48. Formed at the other end 49*b* of the clamp lever 49 is a hook 49*c* which is adapted to engage a forward end of a positioning lever 52 secured to a rotary shaft 51 of a pickup arm 50 as shown in FIG. 7.

A clutch lever 53 formed at its forward end with an offset portion 53*a* is pivotally supported by a shaft 54 secured to the other end 45*b* of the detection lever 45. A lever 56 pivotally supported by a shaft 55 is disposed along the clutch lever 53 and has one end 56*a* which is normally urged to move in one direction by the biasing force of a spring 57. The lever 56 has the other end 56*b* thereof which is formed with a cam surface 60 adapted to come into contact with a first pin 59 provided in a well-known automatic drive gear 58 and a bent edge portion 61 adapted to come into engagement with a side surface of the clutch lever 53. A spring 62 is mounted between the clutch lever 53 and the detection lever 45 so as to move them toward each other.

Figure 6:
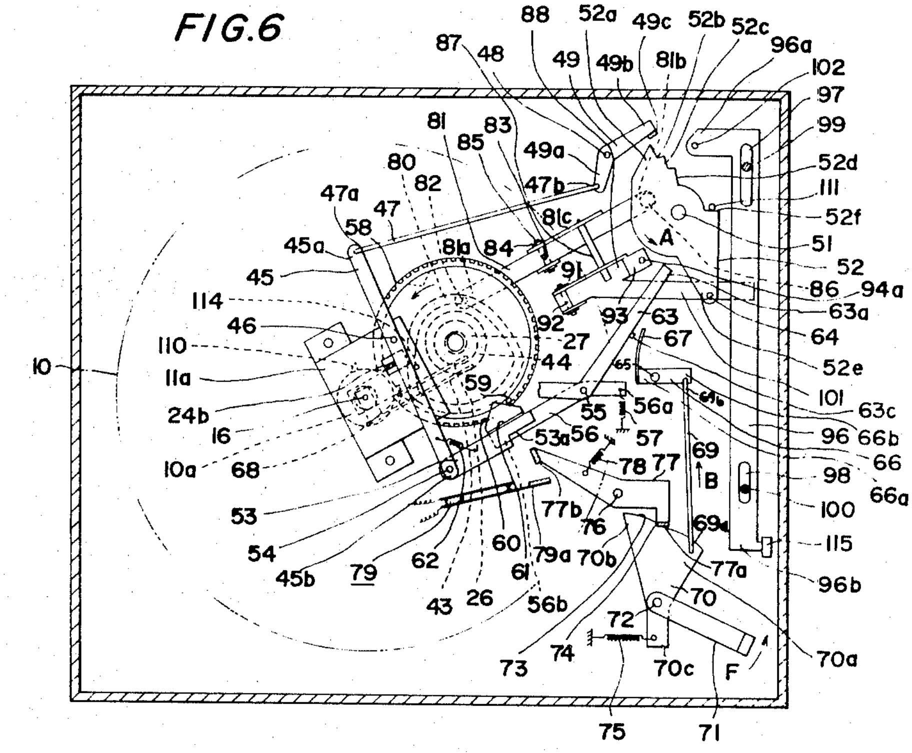
FIG. 6 is a plan view of an embodiment of the device according to this invention with the base plate removed.

In FIG. 6, an inverted L-shaped lever 63 is pivotally supported by the shaft 55 together with the lever 56. The lever 63 has one end 63*a* which is adapted to be moved by a pin 64 provided at the other end 52*e* of the positioning lever 52 and also moved in the same direction by a plate spring 67 provided at one end 66*a* of a lever 66 pivotally supported by a shaft 65. The lever 63 has the other end 63*b* which is adapted to drive a tripping mechanism subsequently to be described which is provided in a toothless portion 68 of the automatic drive gear 58 shown in FIG. 10.

Further referring to FIG. 6, a rod 69 pivotally connected at one end 69*a* thereof to a right upper portion 70*a* of a segmental cam plate 70 is pivotally connected at the other end thereof to the other end 66*b* of the lever 66. The cam plate 70 is secured to a rotary shaft 72 of an operation lever 71 associated with an operation knob. The cam plate 70 is formed in its left upper portion 70*b* with a cam surface 73 and a stepped portion 74 contiguous therewith. The cam plate 70 has a lower end portion 70*c* which is normally urged to move in pivotal motion in the clockwise direction by the biasing force of a spring 75.

A lever 77 pivotally supported by a shaft 76 is urged by the biasing force of a spring 78 to cause a hook 77*a* thereof to press against the cam surface 73 and offset portion 74. A forward end portion 77*b* of the lever 77 opposite to the hook 77*a* extends into the locus of pivotal movement of the clutch lever 53. A movable contact 79*a* of a power source switch 79 is disposed in the locus of pivotal movement of the forward end portion 77*b* of the lever 77.

In FIGS. 6 and 7, formed on the underside of the automatic drive gear 58 besides the cams 27 and 44 shown in FIG. 1 is a groove cam 80 in which is engaged a pin 82 provided at one end 81*a* of a lever 81. The lever 81 has an upright surface portion 81*c* which is supported for vertical pivotal motion by a shaft 85 secured to a pivotally supporting member 84 supported for horizontal pivotal motion by a shaft 83 secured to the base plate 11. This arrangement makes it possible for the lever 81 to be moved in horizontal pivotal motion by the groove cam 80 and in vertical pivotal motion by virtue of a variation in the depth of the groove cam 80.

A rubber member 86 is provided on the upper surface of the other end 81*b* of the lever 81 and adapted to come into engagement with the underside of the positioning lever 52 when the lever 81 moves in vertical pivotal motion in a direction of an arrow C in FIG. 7. Provided at the upright surface portion 81*c* of the lever 81 is a pin 87 which is received in a slot 89 formed in a lever 88 which is supported for vertical pivotal motion by a shaft 92 secured to a pivotal supporting member 91 secured by a screw 90 to the base plate 11. Secured to the forward end of the lever 88 is a plate spring 93 which supports a lower end 94*a* of an elevational lift 94 on which the pickup arm 50 rests. The one end 81*a* of the lever 81 is normally urged by the biasing force of a spring 95 to move upwardly.

Further referring to FIG. 6, the positioning lever 52 is formed with offset portions 52*b*, 52*c* and 52*d* for determining the lower positions of the pickup arm 50. A positioning bar 96 slidably mounted for cooperation with the positioning bar 96 is guided by fixed pins 99 and 100 received in slots 97 and 98 respectively formed in the bar 96. Besides being able to move in sliding motion in a horizontal plane, the positioning bar 96 is adapted to be displaced in a vertical plane. The displacement of the positioning bar 96 in a vertical plane is effected when the plate 96 is moved upwardly by the forward end of a branch arm 101 of the lever 88. A pin 102 provided at one end 96*a* of the positioning bar 96 is adapted to be brought into the locus of pivotal movement of the offset portion 52*b*, 52*c* or 52*d* of the positioning lever 52 only when the positioning bar 96 is moved upwardly. A knob 115 is provided at the other end 96*b* of the positioning bar 96. By moving the knob 115, it is possible to cause the positioning bar 96 to move in sliding motion in a horizontal plane as guided by the pins 99 and 100 received in the slots 97 and 98 respectively.

The positioning bar 96 is moved in sliding motion in a horizontal plane such that the pin 102 provided at one end 96*a* of the bar 96 is selectively brought into the locus of pivotal movement of the offset portion 52*b*, 52*c* or 52*d* of the positioning lever 52. Thus, a needle (not shown) mounted in the pickup arm is led into the groove of a record of any size (30, 25 or 17 centimeters) by selectively bringing the pin 102 into engagement with any one of the offset portions 52*b*, 52*c* and 52*d*.

The operation of the embodiment of the device constructed as aforementioned will now be explained. After records 103 and 104 are placed on a plurality of support arms 18 (three in number on this embodiment) spread out as shown in FIG. 1, the operation lever 71 is turned in the direction of an arrow F in FIG. 6 so as to start the operation of the automatic record changer device. The movement of the operation lever 71 causes the cam 70 to move in pivotal motion in the same direction, so that the lever 77 which has been moved in pivotal motion by the cam surface 73 is moved in pivotal motion about the shaft 76 by the biasing force of the spring 78 so as to close the power source switch 79. This causes a motor (not shown) to start rotating, and the turntable 11, which is connected to the motor by known means, starts rotating.

As the cam plate 70 moves in pivotal motion, the rod 69 moves in the direction of an arrow B in FIG. 6 and the lever 66 moves in pivotal motion about the shaft 65, resulting in the plate spring 67 mounted at one end 66*a* of the lever 66 pushing a projection 63*c* on the lever 63 and causing the lever 63 to move in pivotal motion about the shaft 55. This causes the other end 63*b* of the lever 63 to actuate the well-known tripping mechanism as shown in FIG. 10, so that the automatic drive gear 58 starts rotating in the direction of the arrow and makes one complete revolution.

Figure 10:
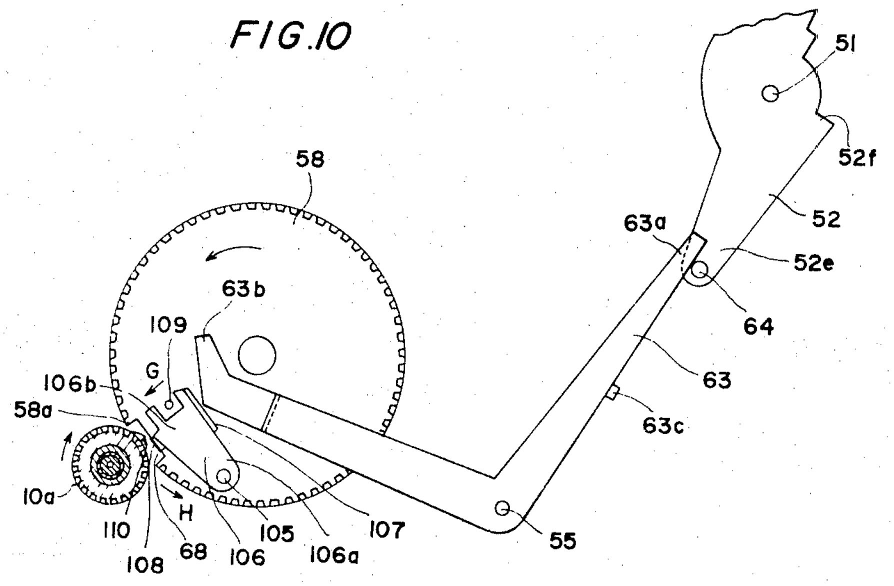
FIG. 10 is a plan view of a cycle change mechanism of the embodiment shown in FIG. 6.

The cycle change mechanism shown in FIG. 10 is well-known. The mechanism will be explained briefly to enable the invention to be clearly understood.

A trip 106 is pivotally supported at one end 106*a* of the trip 106 by a shaft 105 secured to the toothless portion 68 on the outer peripheral surface of the automatic drive gear 58. The trip 106 is formed with an inwardly projection 107 on one side of the other end 106*b* thereof and with an outward projection 108 on the other side thereof opposite to the one side, the outward projection 108 being adapted to be disposed on the toothless portion 68 when the trip 106 moves in pivotal motion. 109 is a stopper.

If the lever 63 moves in pivotal motion about the shaft 55 in the anticlockwise direction, then the other end 63*b* of the lever 63 pushes the inward projection 107 of the trip 106, so that the other end 106*b* of the trip 106 moves in the direction of an arrow G as the trip 106 moves in pivotal motion about the shaft 55.

This brings the outward projection 108 of the trip 106 into engagement with a projection 110 provided in the base of the turntable in a position corresponding to the position of the outward projection 108 and adapted to rotate with the turntable gear 10*a* as a unit. Thus, a first tooth 58*a* in the toothless portion 68 is brought into meshing engagement with the turntable gear 10*a* and causes the automatic drive gear 58 to make one complete revolution.

If the pickup arm advances and reaches the lead-out groove of the record, for example, then the pin 64 provided at the other end 52*e* of the positioning lever 52 pushes and moves one end 63*a* of the lever 63, thereby performing a drive operation similar to that described above. Thus, the pickup arm is restored to its original rest position.

If the hand is released from the operation knob associated with the operation lever 71, then the cam plate 70 is caused by the biasing force of the spring 75 to move slightly in pivotal motion in the reverse direction, but the hook 77*a* of the lever 77 engages the offset portion 74 of the cam plate 70 and stops the movement of the cam plate 70. The groove cam 80 provided on the underside of the automatic driving gear 58 causes the lever 81 to move in pivotal motion in the anticlockwise direction in FIG. 7, thereby bringing the rubber piece 86 at the forward end thereof into pressing engagement with the underside of the positioning lever 52. At the same time, the pin 87 provided on the lever 81 causes the lever 88 to move in pivotal motion in the anticlockwise direction, thereby moving the pickup arm 50 upwardly. Then, the lever 81 moves in pivotal motion in the clockwise direction in FIG. 6 and tries to frictionally drive the positioning lever 52 in the direction of an arrow A through the agency of the rubber piece 86 pressing against the lever 52. However, since the positioning lever 52 is prevented from movement by a stopper 111, the rubber piece 86 slips along the underside of the positioning lever 52.

Then, the cam 44 causes the lever 43 to move in pivotal motion in the clockwise direction about the shaft 42 in FIG. 1 against the biasing force of a spring 112 mounted between the lever 43 and the subsidiary base plate 11*a*. As a result, the spindle 16 is moved upwardly as shown in FIG. 2, so that the bevelled portion of the conical piece 39 of the spindle 16 is brought into engagement with the inner surface of the L-shaped plate spring 32 supporting the spreading members 30 and causes the spreading members 30 to spread apart against the biasing force of the plate spring 32. This results in the lower projections 30*a* of the spreading members 30 projecting outwardly of the windows 29.

The inwardly bent portions 37 at the lower end of the windows 29 are disposed in a position slightly above the record 104 second from the bottom of the records 103 and 104 resting on the support arms 18. With this arrangement, the spreading members 30 which slides on the upper surfaces of the bent portions 37 in their spreading motion are brought into pressing engagement with the inner wall of the center opening of the second record 104 from the bottom so as to hold the record 104 in place.

When this state is brought about, the cam 27 causes the drive lever 26 to move in pivotal motion in the clockwise direction about the shaft 23 in FIG. 1 against the biasing force of a spring 113 mounted between the lever 26 and the subsidiary base plate 11*a*. As the lever 26 moves in pivotal motion, the L-shaped lever 24 tries to move in the same direction, but the lever 24 is prevented from moving in pivotal motion in the clockwise direction because the support arms 18 and hollow spindle 15 are prevented from moving upwardly by the records 103 and 104 which are prevented from moving upwardly by the spreading members 30. Accordingly, the detection lever 45 maintained in contact with the vertical arm 24*b* of the L-shaped lever 24 is maintained in the position shown in FIG. 6.

After being moved in pivotal motion in the clockwise direction as aforementioned, the drive lever 26 is then moved in pivotal motion in the anticlockwise direction. As a result, the vertical arm 24*b* of the L-shaped lever 24 is pushed by the engaging portion 26*a* of the drive lever 26 and to move in the same direction as the drive lever 26, so that the hollow spindle 15 is caused to move downwardly by the biasing force of the spring 25. At this time, outer edges of the support arms 18 are brought into engagement with lower ends 22*a* of the slots 22 formed in the tube 14 and pushed thereby, so that the support arms 18 moves in pivotal motion about the ring 19 against the biasing force of the plate springs 21 to be finally withdrawn into the slots 22. Withdrawal of the support arms 18 causes the record 103 supported by the forward ends of the arms 18 to move downwardly onto the turntable 10. At this time, the record 104 second from the bottom and the records disposed on it, if any, are supported by the spreading members 30 and prevented from moving downwardly.

Then, the drive lever 26 is restored to its position in FIG. 1 and a little later on the lever 43 is also restored to its position, so that the spindle 15 is restored to its position shown in FIG. 1.

After the records are changed in this way, the lever 81 is moved in the anticlockwise direction. As a result, the positioning lever 52 is moved in the clockwise direction while it is maintained in frictional engagement with the rubber piece 86, so that the pickup arm 50 is moved into a performance starting position. Such movement of the positioning lever 52 is prevented by the engagement of any one of the offset portions **52*b*, 52*c* and 52*d* provided in the lever 52 with the pin 102 provided at one end 86*a* of the positioning bar 96. The movement of the lever 81 thereafter is effected by the slipping occurring between the underside of the positioning lever 52 and rubber piece 86**.

Immediately before the automatic drive gear 58 completes its one revolution, the lever 81 is restored to its position for pivotal movement in a horizontal plane as shown in FIG. 6. Then, the lever 81 is restored to its position for pivotal movement in a vertical plane as shown in FIG. 7 by virtue of the deepening of the cam groove 80. Accordingly, the lever 88 is also restored to its original position, thereby moving the pickup arm 50 downwardly onto the record.

Thereafter, the positioning bar 96 which has been held in an upper position by the branching arm 101 of the lever 88 also moves downwardly and the pin 102 provided at its forward end moves to a position in which it is disposed below the plane of pivotal movement of the positioning lever 52, so that the pin 102 is prevented from engaging any of the offset portions of the positioning lever. As the lever 81 is restored to its original position, the rubber piece 86 is released from engagement with the underside of the positioning lever 52. This permits the pickup arm 50 to move freely in pivotal motion in a horizontal plane. Thus, the playing of the record is started.

When the playing of the record 103 is finished, the pin 64 provided at the other end **52*e* of the positioning lever 52 pushes and moves one end 63*a* of the lever 63 so as to actuate the aforementioned tripping mechanism and cause the automatic drive gear 58 to start rotating. It is to be understood that, by turning the knob associated with operation lever 71 in the direction of the arrow F in FIG. 6, it is possible to cause the automatic drive gear 58 to start rotating even during the performance of the record 103**.

In FIG. 7, the lever 88 is moved in pivotal motion in a vertical plane by the lever 81 which moves in pivotal motion in a vertical plane by virtue of the groove cam 80, so that the pickup arm 50 is moved away from the upper surface of the record 103. Then, the rubber piece 86 is brought into pressing engagement with the underside of the positioning lever 52. The positioning lever 52 moves in pivotal motion in the anticlockwise direction when the lever 81 moves in a horizontal plane in FIG. 6, till a locking portion **52*f* of the positioning lever 52 engages the stopper 111. The pivotal movement of the positioning lever 52 restores the pickup arm 50 into its position on the rest 94**.

Following this, the aforementioned record changing operation is performed. When only one record 104 is supported by the support arms 18, for example, the operation is the same as aforementioned except for the fact that the upward movement of the record 104 is prevented by the lower ends of the spreading members 30 fully spread apart in an upwardly diverging manner.

When there is no record supported by the support arms 18, for example, the support arms 18 are free to move upwardly when the drive lever 26 moves in pivotal motion in the clockwise direction, so that the L-shaped lever 24 is urged by the biasing force of the spring 28 to move in pivotal motion in the same direction (See FIG. 2). As a result, the detection lever 45 is pushed by the vertical arms **24*b* of the L-shaped lever 24 to move in pivotal motion in the anticlockwise direction as shown in solid lines in FIG. 9**.

The pivotal movement of the detection lever 45 causes the rod 47 pivotally connected to one end **45*a* of the lever 45 to move in a direction of an arrow D, thereby moving the clamp lever 49 in pivotal motion in the clockwise direction. This brings the hook 49*c* provided at the forward end of the clamp lever 49 into the locus of movement of the forward end 52*a* of the positioning lever 52**.

On the other hand, the clutch lever 53 pivotally connected to the other end **45*b* of the detection lever 45 moves in a direction of an arrow E as the detection lever 45 moves in pivotal motion in the anticlockwise direction as aforementioned. This results in an increase in the area of the overlapped portions of the lever 53 and the lever 56, with a result that the offset portion 53*a* that has been positioned against the forward end 77*b* of the lever 77** shifts its position.

The automatic drive gear 58 continues its rotation in the anticlockwise direction and causes the lever 81 to move in the direction opposite to the direction aforementioned by the action of the groove cam 80. As the lever 81 moves in this way, the positioning lever 52 tries to move in pivotal motion in the clockwise direction by virtue of its frictional engagement with the rubber piece 86. However, this pivotal movement of the lever 52 is prevented by the clamp lever 49. Accordingly, the pickup arm 50 which is secured to the rotary shaft 51 as shown in FIG. 7 is prevented from moving in pivotal motion in the horizontal plane and remains stationary on the rest 94.

At the terminal stages of one complete revolution of the automatic drive gear 58, the first pin 59 provided on the gear 58 pushes the cam surface 60 of the lever 65 and moves the same in pivotal motion in the anticlockwise direction. The pivotal movement of the lever 56 causes the bent edge portion 61 thereof to push one side of the clutch lever 53 and moves the clutch lever 53 in pivotal motion in the clockwise direction about the shaft 54.

When there is no record on the spindle and the detection lever 45 has not moved in pivotal motion and is disposed in a position shown in FIG. 8, the pivotal movement of the clutch lever 53 as aforementioned does not cause the lever 77 to move in pivotal motion because the offset portion **53*a* of the clutch lever 53 is positioned against the forward end 77*b* of the lever 77. However, when there is no record on the spindle and the detection lever 45 has moved in pivotal motion from its position in FIG. 8 to its position in FIG. 9, the pivotal movement of the clutch lever 53 in the clockwise direction results in the forward end $77_b$ of the lever 77 being pushed by one side of the clutch lever 53 because the offset portion 53*a* of the clutch lever 53 has moved in a direction of an arrow E. As a result, the lever 77 is slightly moved in pivotal motion in the anticlockwise direction and the hook 77***a* of the lever 77 is released from engagement with the offset portion 74 of the cam plate 70. The cam plate 70 thus released from engagement with the hook 77*a* is caused to move in pivotal motion in the clockwise direction by the biasing force of the spring 75. The pivotal movement of the cam plate 70 causes the cam surface 73 to push and move the hook 77*a* upwardly, thereby causing the lever 77 to move in pivotal motion in the clockwise direction over a substantial distance. The forward end 77*b* of the lever 77 pushes the movable contact 79*a* of the power source switch 79 to turn off the power source switch. The inertia of the turntable 10 or the operation of a nodal drive mechanism (not shown) provided in the automatic drive gear 58 may cause the automatic drive gear 58 to continue its movement slightly thereafter. The gear 58 finally stops in a position in which the toothless portion 68 thereof is justaposed to a turntable gear 10*a* provided in the base portion of the turntable 10 as shown in FIGS. 6 and 10.

Figures 3, 9:
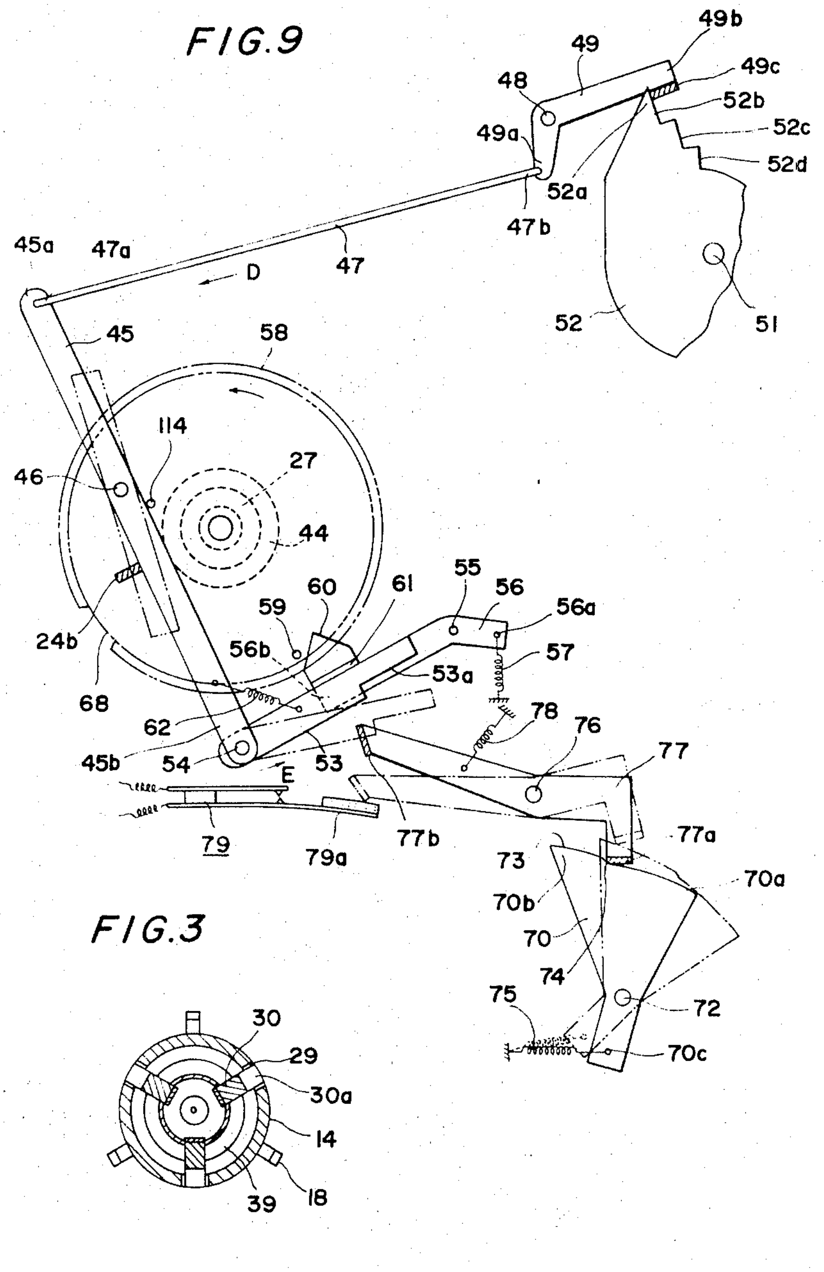
FIG. 3 is a view in section taken along the line III—III of FIG. 1.
FIGS. 8 and 9 are front views of a stop mechanism of the embodiment shown in FIG. 6.

Immediately before the automatic drive gear 58 comes to a halt, a second pin 114 provided on the upper surface of the gear 58 pushes one side of the detection lever 45 which is moved in pivotal motion in the clockwise direction into its original position (See FIG. 9). Thus, all the elements of the device are rendered inoperative.

Although the drawings and description relate to one embodiment of this invention, it should be understood that there is no intention to limit the invention to the disclosed construction and instead it is intended that the invention should extend to all alternative embodiments and constructions falling within the scope of the following claims.

I claim:

1. An apparatus for automatically changing records, comprising:

a main tubular record spindle body;

a first spindle member having a central axial bore formed therein and mounted for longitudinal movement in first and second opposite directions within said tubular spindle body;

a plurality of record supporting members pivotally mounted at one end portion of said first spindle member for supporting a stack of records thereon;

said first spindle member being detactably movable in said second direction only when no record is supported on said supporting members;

a second spindle member mounted for longitudinal movement within said central axial bore;

a conical member provided at one end portion of said second spindle member;

a plurality of record holding members disposed at one end portion of said conical member for supporting all but the lowermost record of said stack allowing said lowermost record to be dropped into a playing position;

first and second cam surfaces mounted for rotation on said apparatus;

operating means connected to said cam surfaces for imparting rotational movement to said cam surfaces;

a first drive member contacting said first spindle member at the end portion thereof opposite said one end portion thereof for moving said first spindle member longitudinally in said tubular spindle body;

a second drive member connected to said first cam surface and said first drive member for moving said first spindle member longitudinally in one of said first and second directions upon the rotation of said first cam surface;

a shaft on which said first and second drive members are mounted for pivotal movement;

said second drive member contacting said first drive member directly in a first position of said first cam surface to urge said first drive member to move in a first rotational direction, said first spindle member being thereby moved in said first longitudinal direction thereof;

means resiliently connecting said first and second drive members for resiliently urging said first drive member in a second rotational direction thereof when said second drive member contacts said first cam surface in a second position thereof, said first spindle member being thereby moved in the second longitudinal direction thereof;

third driving means connected to said second cam surface for moving said second spindle member longitudinally in said central axial bore;

said first cam surface being so shaped and positioned to drive said second drive member first in a direction to move said first spindle member in its second longitudinal direction and thereafter in a direction to move said first spindle member in its first longitudinal direction;

detecting means for detecting the detectable movement of said first spindle member in its second longitudinal direction beyond a predetermined location; and stopping means connected to said detecting means for disengaging said operating means from said cam surfaces to stop the rotation thereof when said detecting member detects the movement of said first spindle member in its second longitudinal direction.

2. The apparatus according to claim 1, further comprising: a source of rotational motion; and automatic drive gear means on which said first and second cam surfaces are mounted for rotation therewith; wherein said operating means comprises an operating lever and tripping means connected to said automatic drive gear means for engaging said automatic drive gear means with said source of rotational motion when said operating lever engages said tripping means.

3. The apparatus according to claim 2, further comprising: a power source switch connected to said source of rotational motion; and further lever means for moving said operating lever into engagement with said tripping means, said further lever means being mounted for opening and closing said power source switch.

4. The apparatus according to claim 3, wherein said further lever means comprises:

a clutch member driven by said detecting means;

a movable member mounted for engagement with and movable by the rotation of said automatic drive gear;

a locking member mounted for engagement with and movable by said clutch member when said movable member engages said clutch member upon engagement of said movable member by said automatic drive gear;

a further movable member engaging said locking member; and biasing means connected to said further movable member and urging said further movable member into movement upon movement of said locking member out of locking engagement with said further movable member, said further movable member urging said locking member into engagement with said power source switch to open the contacts of said switch, thereby shutting off the supply of power to said source of rotational motion.

5. An apparatus for automatically changing records, comprising:

a main tubular record spindle body;

a first spindle member having a central axial bore formed therein and mounted for longitudinal movement in first and second opposite directions within said tubular spindle body;

a plurality of record supporting members pivotally mounted at one end portion of said first spindle member for supporting a stack of records thereon;

said first spindle member being detectably movable in said second direction only when no record is supported on said supporting members;

a second spindle member mounted for longitudinal movement within said central axial bore;

a conical member provided at one end portion of said second spindle member;

a plurality of record holding members disposed at one end portion of said conical member for supporting all but the lowermost record of said stack allowing said lowermost record to be dropped into a playing position;

first and second cam surfaces mounted for rotation on said apparatus;

operating means connected to said cam surfaces for imparting rotational movement to said cam surfaces;

a first drive member mounted for pivotal movement and contacting said first spindle member at the end portion thereof opposite said one end portion thereof, said first drive member being driven in a first pivotal direction by a first portion of said first cam surface for urging said first spindle member into movement longitudinally in said first direction in said tubular spindle body upon rotation of said first cam surface;

means for resiliently urging said first drive member in a second pivotal direction when said first drive member is driven by a second portion of said first cam surface, said first spindle member being thereby urged into movement in the second longitudinal direction thereof;

second driving means connected to said second cam surface for moving said second spindle member longitudinally in said central axial bore;

said first cam surface being so shaped and positioned to drive said first spindle member in its second longitudinal direction to move said first spindle member in its second longitudinal direction and thereafter in the first direction of said first drive member to move said first spindle member in its first longitudinal direction;

detecting means for detecting the detectable movement of said first spindle member in its second longitudinal direction beyond a predetermined location; and stopping means connected to said detecting means for disengaging said opening means from said cam surfaces to stop the rotation thereof when said detecting means detects the movement of said first spindle member in its second longitudinal direction.

* * * * *